United States Patent [19]

Chen et al.

[11] Patent Number: 4,743,216
[45] Date of Patent: May 10, 1988

[54] ROTARY SAFETY COUPLING FOR TRANSMITTING LARGE TORQUES

[75] Inventors: Qin B. Chen; Mao G. Yin, both of Chengdu; Qin D. Zhou, Chongqing, all of China

[73] Assignee: Chengdu Seamless Steel Tupe Plant, China

[21] Appl. No.: 843,995

[22] Filed: Mar. 25, 1986

[30] Foreign Application Priority Data

Apr. 1, 1985 [CN] China ............................ 85101485

[51] Int. Cl.[4] ............................................. F16D 3/68
[52] U.S. Cl. .................................... 464/17; 464/33; 464/85
[58] Field of Search ............. 403/2; 464/17, 32, 33, 464/73, 74, 76, 83, 85

[56] References Cited

U.S. PATENT DOCUMENTS

| | | | |
|---|---|---|---|
| 2,301,659 | 11/1942 | Ricefield | 464/73 |
| 2,764,003 | 9/1956 | Croset | 464/74 |
| 2,932,179 | 4/1960 | Grant | 464/76 |
| 3,246,483 | 4/1966 | Schmitter | 464/33 |
| 3,678,708 | 7/1972 | Ernst et al. | 464/17 |
| 3,831,724 | 8/1974 | Baer | 464/73 X |
| 4,385,893 | 5/1983 | Kirschey | 464/76 X |
| 4,627,885 | 12/1986 | Arlt | 464/76 X |

FOREIGN PATENT DOCUMENTS

| | | | |
|---|---|---|---|
| 2901572 | 7/1980 | Fed. Rep. of Germany | 464/32 |
| 518613 | 12/1956 | Italy | 464/83 |
| 153906 | 7/1932 | Switzerland | 464/33 |
| 823690 | 4/1981 | U.S.S.R. | |
| 826120 | 5/1981 | U.S.S.R. | |

*Primary Examiner*—Daniel P. Stodola
*Attorney, Agent, or Firm*—Kenyon & Kenyon

[57] ABSTRACT

A rotary elastic safety coupling for steel rolling mills comprises two coupling halves and an intermediate disk, elastic rubber components being provided in one of the coupling halves for absorbing shocks, while transmitting normal torques. A plurality of angularly equispaced wedge-shaped cantilever arms are attached to the intermediate disk. The cantilever arms have projecting portions which are received in respective wedge-shaped cavities on a driven coupling half. The projecting portions of the cantilever arms are flanked on both sides by the elastic shock-absorbing components, these components also being mounted in the cavities on the driven coupling half. The elastic shock-absorbing components are installed in a prestressed condition, whereby large rolling torques are transmitted without play upon reversals in the direction of force transmission. The intermediate disk, connected to the driven coupling half by the cantilever arms, is connected to a drive coupling half by fracturable safety pins.

30 Claims, 4 Drawing Sheets

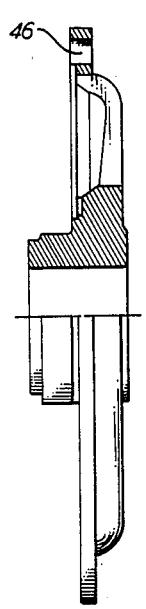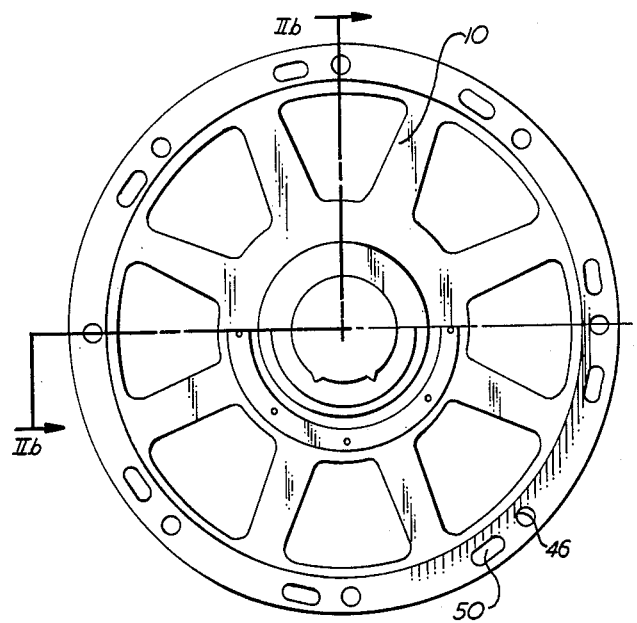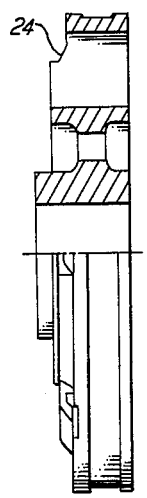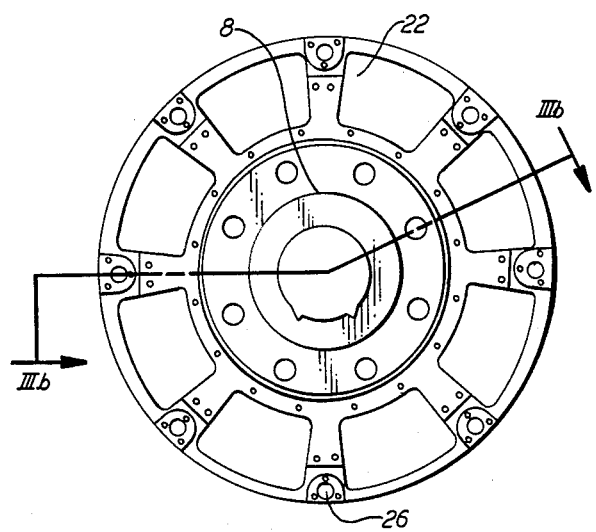
FIG.2B  FIG.2A
FIG.3B  FIG.3A

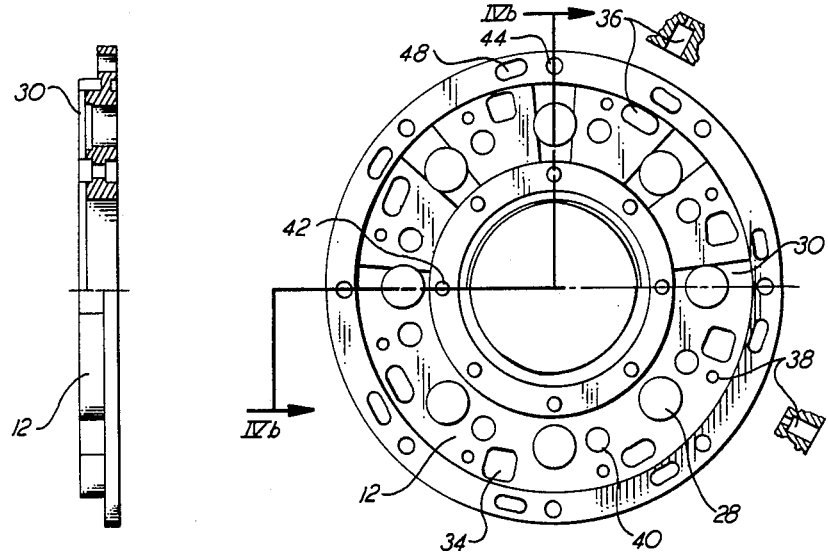
FIG.4B  FIG.4A
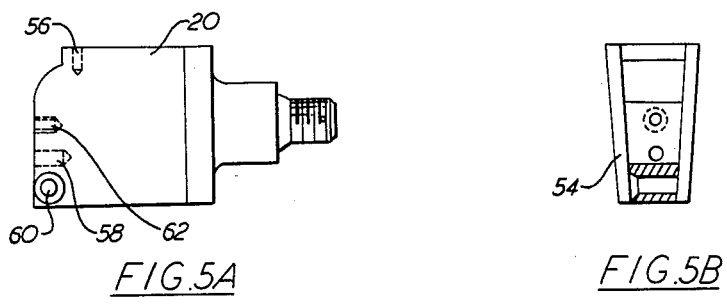
FIG.5A  FIG.5B
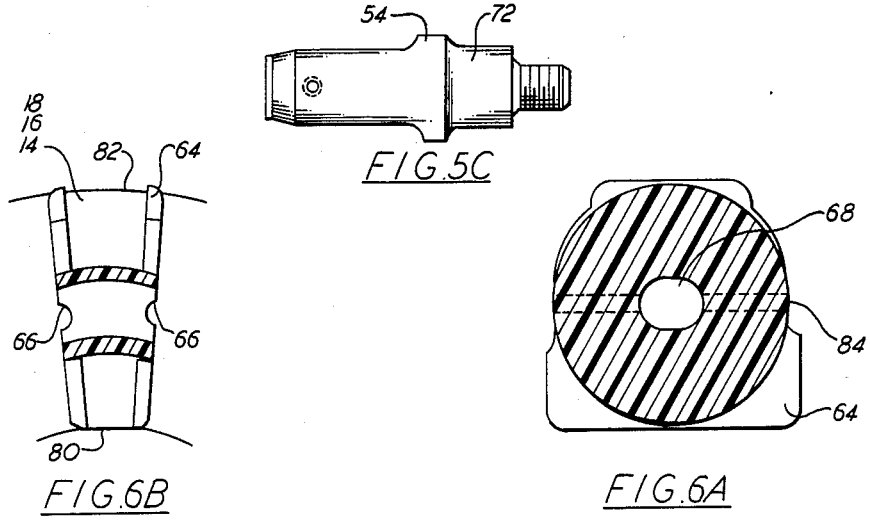
FIG.5C
FIG.6B  FIG.6A

ROTARY SAFETY COUPLING FOR TRANSMITTING LARGE TORQUES

BACKGKROUND IF THE INVENTION

This invention relates to rotary couplings, particularly for transmitting large torques in steel rolling machines and protecting the transmission equipment. More particularly, this invention relates to such couplings which are designed for safety and which have rubber shock-absorbing elements.

Most rolling machines operate under a heavy load and implement process strengthening during rotation. There often exist strong shocks, serious torsional vibrations and axial deviations of moving parts in the main transmission system of a rolling machine. Some rolling machines have torque amplifying factors (TAF) of up to 6 or 7. As a result, it is easy to seriously wear the components in the transmission system, fracture the machine frame and damage the foundation.

Large rotary safety couplings in such rolling machines should have, apart from the capability of transmitting large torques, the following technical characteristics to reduce or eliminate the above-mentioned harmful movements: a sufficiently high shock-absorbancy; an easily adjustable torsional rigidity; a multi-directionally adaptable deviation of the connecting shaft; an easily achievable axial alignment; an absence of play during torsion transmission; an absence of axial movement between connected machines when assembled; and easily changeable and durable elastic shock-absorbing components.

The West German Cardeflex coupling disclosed in British Pat. No. 771034 is a shock-absorbing coupling with metal springs. It meets fairly the requirements of rolling machines with respect to the heavy load couplings. Torque is transmitted by a set of cylindrical metal compression springs arranged in the direction tangential to the periphery of a coupling. Such couplings have been adopted for the main transmission systems of rolling machines in many countries. Large metal springs for Cardeflex couplings, however, are not convenient to install or remove. The whole set of springs must first be prestressed by means of a special ring and tightened to a ring-like form with preselected sizes. Then careful and time consuming alignment should be performed to complete the installation of the springs. Moreover, the springs can not be separately changed. The prestressing applied by the ring can be too large and installation and removal of the springs are unsafe and time consuming. Also, it is difficult to adjust the rigidity of the elastic components at the location of a rolling machine.

In the configuration of rotary shock-absorbing couplings disclosed in Soviet Pat. No. 826120, a radial toothplate for transmitting force is an integral structure. A single toothplate can not be separately changed upon malfunction or fracture thereof. Moreover, the elastic components in such a coupling are not stressed and some play between them may appear during rotation. In addition, they cannot sustain the shock of heavy loads at various rotating speeds.

Another configuration of rotary couplings disclosed in Soviet Pat. No. 823690 can only transmit very small torques. The elastic shock-absorbing components of these couplings are not prestressed during installation and play may also appear during rotation. Moreover, the lifetime of the elastic components is rather short because of uneven deformation of the rubber.

SUMMARY OF THE INVENTION

An object of the present invention is to provide an improved rotary coupling of the above-described type which can meet the specific force transmission requirements of heavy rolling machines and the like.

Another, more particular, object of the present invention is to provide such a coupling which not only transmits large rolling torques but also eliminates structural transmission play which might otherwise appear during rotation, whereby the peak value of the dynamic load on the main transmitting system is reduced.

Yet another particular object of the present invention is to provide such a coupling with elastic components which are easy to change, whereby the rigidity of the transmission system can be easily adjusted at the rolling station.

Another object of the present invention is to provide such a coupling in which the elasticity in both forward and backward rotating directions can be adjusted and in which adaptability to three-dimensional displacements of connected shafts is provided.

Another object of the present invention is to provide such a coupling with elastic shock-absorbing force-transmission components which have a long expected life span and to provide such a coupling with a structural design which is reasonable with uniform deformation and long time.

According to the present invention, a plurality of wedge-shaped cantilever arms are fixed to an intermediate disk disposed between two coupling halves. The wedge-shaped arms project into respective receiving structures (e.g., wedgeshaped cavities or openings) on the driven coupling half, the wedge-shaped arms being flanked on opposite sides by elastic shock-absorbing force transmission components also disposed in the receiving structures. These elastic components are preferably made of rubber and are prestressed, whereby they can transmit large rolling torques without play upon reversals in the direction of force transmission.

For rolling machines which cannot be reversed, forward and rearward elastic components, i.e., components on a downstream or force transmitting side and components on an upstream or force receiving side of each arm, can vary in number and in rigidity characteristics. The forward components are the main springs which transmit rolling torque, whereas the rearward components always remain prestressed during rotation. The rearward components not only reduce the shock on the arms from the rearward or upstream direction, but also eliminate play in power transmission for the coupling owing to their coordinate push-pull deformation with the forward components. For reversible rolling machines, the forward and rearward elastic components on the opposite sides of the wedge-shaped arms advantageously have the same number, the same rigidity and the same specifications so that the coupling has the same working characteristics for both forward and backward rotations.

Safety pins are fixed along the outer periphery of the drive coupling half and the intermediate disk. In this way, the coupling pins are easy to change. Moreover, their sizes and weights can be reduced, whereby the cost of the pins can be minimized.

The prestressing of the elastic shock-absorbinq force-transmission components can be produced by means of a special tool. Furthermore, the elastic components can be prestressed and installed at the same time in the wedge-shaped cavities. Of course, the prestressing can be achieved through other ways.

The wedge-shaped cantilever arms and the elastic components of a coupling in accordance with the invention can be replaced independently. The procedure for removal is essentially same as that for installation. In accordance with specific features of the present invention, there are many operational holes with different functions on the two coupling halves and the intermediate disk. With these holes, the assembly and disassembly procedures can be implemented easily, quickly and safely.

The load carrying elements in a rotary safety coupling according to this invention are the elastic components. These components have a wedge-shaped crosssection in a plane parallel to the intermediate disk and are arranged in the direction of transmitting force. In a plane perpendicular to the intermediate disk and to the direction of force transmission through the elastic components, these components have a ring-shaped or annular cross-section.

The wedge-shaped elastic components are designed and placed so that the loads on each component are uniform, whereby the elastic components experience the same relative compression deformation along the radial direction and the durability of these components is increased.

The periphery of the ring-shaped load-carrying section of each elastic component has locating edges for ensuring that the load-carrying surfaces contact effectively. In the component body there are tunnels or grooves which dissipate heat by a self-pumping effect during compression deformation, the dissipation of heat serving to enhance the load-carrying ability and durability of the elastic components.

If the composition of the rubber material or the number of the elastic components in the coupling is adjusted and the locating pins are replaced by pins with corresponding specifications, the working characteristics (torsional rigidity and maximum elastic rotation angle OMAX) of the coupling can be changed to meet the requirements of different rolling machines.

BRIEF DESCRIPTION OF THE DRAWING

FIG. 2A is a front elevational view, partly in section, of the drive coupling half illustrated in FIG. 1A.

FIG. 2B is partially a side elevational view and partially a cross-sectional view taken along line $II_bII_b$ in FIG. 2A.

FIG. 3A is a front elevational view of the driven coupling half illustrated in FIG. 1A.

FIG. 3B is partially a side elevational view and partially a cross-sectional view taken along line IIIb—IIIb in FIG. 3A.

FIG. 4A is a front elevational view of the intermediate ring-shaped disk illustrated in FIG. 1A.

FIG. 4B is partially a side elevational view and partially a cross-sectional view taken along line $IV_b$—$IV_b$ in FIG. 4A.

FIG. 5A is a side elevational view of a wedge-shaped cantilever arm illustrated in FIG. 1A.

FIG 5B is a front elevational view of the cantilever arm illustrated in FIG. 5A, viewed from the left side in FIG. 5A.

FIG. 5C is a top view of the cantilever arm illustrated in FIGS. 5A and 5B.

FIG. 6A is a cross-sectional view of a wedge-shaped elastic shock-absorbing force-transmission component in the coupling illustrated in FIG. 1A.

FIG. 6B is a front elevational view, partially in cross-section, of the elastic component illustrated in FIG. 6A.

DETAILED DESCRIPTION

Figure 1A:
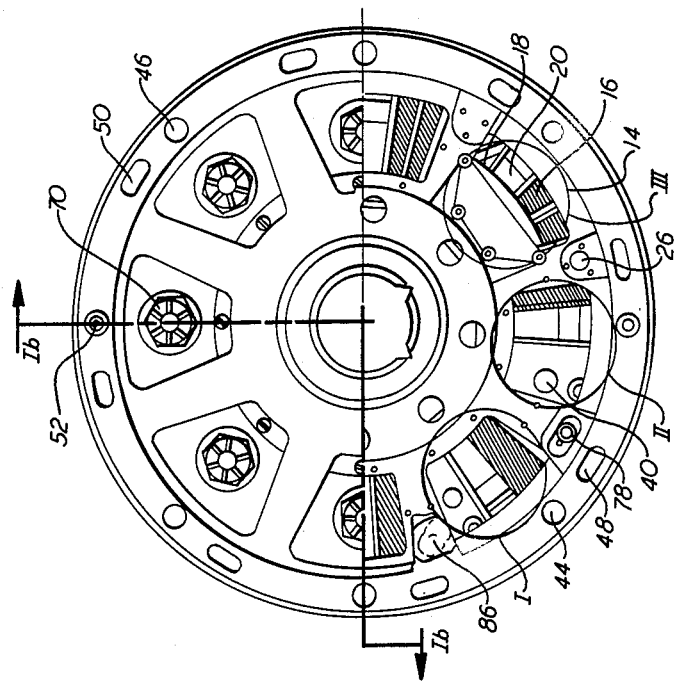
FIG. 1A is a front elevational view, partly in crosssection, of a coupling in accordance with the present invention, showing a drive coupling half, a driven coupling half, an intermediate ring-shaped disk and a wedge-shaped cantilever arm.
Figure 1B:
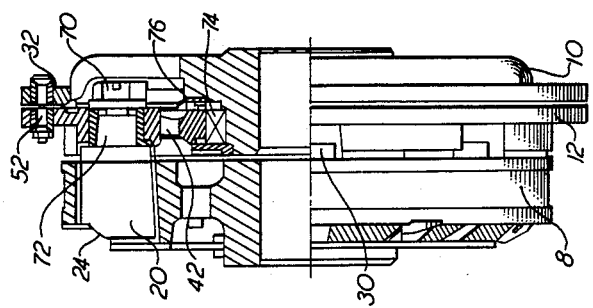
FIG. 1B is partially a side elevational view and partially a cross-sectional view taken along line $I_b$—$I_b$ in FIG. 1A.

As shown in FIGS. 1A and 1B, a rotary safety coupling for transmitting large torques mainly comprises, in accordance with the present invention, a drive coupling half 10, a driven coupling half 8, an intermediate ring-shaped disk 12, forward and rearward wedge-shaped elastic components 14, 16 and 18 and a plurality of wedge-shaped cantilever arms 20. Rubber components 14, 16 and 18 are prestressed, as described in detail hereinafter, and are arranged on both sides of a respective wedge-shaped arm 20, i.e., on a forward or downstream or force-transmission side and on a rearward or upstream or force-receiving side, as defined by the normal direction of force transmission through the coupling. A safety pin 52 (two if desired) is fixed on an outer periphery of the coupling between intermediate disk 12 and drive coupling half 10. In normal operation safety pin 52 transmits torque; if overloading occurs, the pin breaks to protect the equipment.

When the coupling operates, torque is transmitted to intermediate disk 12 from drive coupling half 10 via safety pin 52, then over steel sleeves 32, wedge-shaped arms 20 and, tangential to the direction of rotation, finally to the forward elastic components 14 and 16, which transmit the torque to driven coupling half 8 after the torque is damped in accordance with the elasticity of shock-absorbing force-transmission components 14 and 16. Torque can also be transmitted back from driven coupling half 8 to drive coupling half 10 in a reversed sequence.

Because changes in load mainly come from the driven side of the coupling during the rolling machine operation, rolling torque changes being due to strong shocks from steel rolling, driven coupling half 8 is provided with the elastic or shock-absorbing components 14, 16 and 18. In this way, strong shocks produced during rolling are transmitted to safety pin 52 only after their peak values have been reduced and damped by the elastic components, whereby the pin fracture rate is decreased while the power equipment remains protected.

As illustrated in FIGS. 3A and 3B a set of wedge-shaped cavities 22 is provided along the periphery of driven coupling half 8 for receiving projecting portions of wedge-shaped arms 20 and the forward and rearward wedge-shaped elastic components 14, 16 and 18. The number of the wedge-shaped cavities is preferably even (eight in the drawing). Openings or extensions 24 of the wedge-shaped cavities are provided for facilitating the dissipation of heat and the ventilation of the elastic components and for enabling the observation and maintenance of wedge-shaped arms 20 and elastic components 14, 16 and 18. A set of holes 26 (eight in the drawing) at the outer periphery of coupling half 8 has multiple functions. They can be used for installing angle locating pins, or for installing cylindrical nylon pins when the coupling is modified to a nylon pin coupling, or for supporting special tools to install and/or prestress the elastic components.

As illustrated in on FIGS. 2A, and 2B on the outer periphery of drive coupling half 10, there is formed a set of holes 46 (eight in the drawing) for receiving safety pins 52. Elongated holes 50 are provided for removing safety pins 52 in case of pin fracture. Holes 50 are located at the same radial distance from the center of coupling half 10 as holes 46.

As shown in FIGS. 4A and 4B, intermediate disk 12 is provided with a set of angularly equispaced holes 28 (eight in the drawing). A steel sleeve 32 (see FIG. 1B) is fixed inside each hole 28 and a tapered shank 72 of a wedge-shaped arm 20 is inserted into each steel sleeve 32. A shoulder 54 (see FIGS. 5B and 5c) of the arm 20 is imbedded and located in a wedge-shaped groove 30 at the respective hole 28 to prevent the arm 20 from rotating about its own tapered shank axis during power transmission.

Substantially square holes 34 (four in the drawing) are formed in disk 12 for installation and prestressing of elastic components 14, 16 and 18 and elongated holes 36 (four in the drawing) are provided for enabling the placement of angle locating pins 78. Elongated holes 36 and square holes 34 are arranged alternatively and correspond to holes 26 of coupling half 8. In addition, a plurality of holes 38 (eight in the drawing) are provided in disk 12 for installing nylon pins with steel cores when the elastic coupling in accordance with the invention is modified to a rigid coupling. The holes 38 also correspond to holes 26 in coupling half 8. Holes 36 and holes 38 have the shapes shown in FIG. 4A, so that the cover plate on one end of the holes can be omitted, thus making installation easy and quick.

Each of a plurality of holes 40 (eight in the drawing) formed in disk 12 is aligned with a respective forward elastic component. If the associated cantilever arm 20 is broken, the forward elastic component, which is aligned with its respective hole 40, can be pressed out therethrough. Other holes 42 (eight in the drawing) in disk 12 are used for dissipating heat of elastic components 14, 16 and 18. Holes 44 (eight in the drawing) provided at the outer periphery or edge of intermediate disk 12 correspond to holes 46 in coupling half 10, and receive safety pins 52. Holes 48, for removing broken pins, are at the same distance from the coupling axis as holes 44.

Although many holes are formed in the intermediate disk 12, they are spaced from each other and do not impair the strength of the disk. These holes perform various functions and substantially reduce the weight of the disk.

As illustrated in FIGS. 5A, 5B, and 5C wedge-shaped arms 20 are connecting elements which transmit torque between the two coupling halves 8 and 10 of a coupling in accordance with invention. At the end of the arm 20 where it is mounted in wedge-shaped groove 30 on intermediate disk 12, shoulder 54 not only locates the wedge-shaped arm but also enlarges the section area of the tapered shank root of the arm. In this way, the tapered shank root can be strengthened against breakage. For convenience of installation, on wedge-shaped arm 20 itself are provided holes 56, 58 and 60 for enabling the performance of hoisting operations. A hole 62 is provided for enabling or facilitating removal of wedge-shaped arm 20.

Elastic components 14, 16 and 18 (see FIGS. 6A and 6B) are fabricated by injection moulding and vulcanized, and have a special rubber material composition. The internal structure and physical properties of the elastic components are preferably uniform. In the direction of power transmission, i.e., in a circumferential or tangential direction, the elastic components have wedge-shaped cross-sections (see FIG. 6B) and are distributed along the periphery of the coupling. The inner and outer arcs 80 and 82 of the wedge-shaped cross-section are circles concentric about the coupling axis.

The cross-section of the elastic components 14, 16 and 18 perpendicular to the direction of force transmission is a ring 84, whereby every region of each elastic component sustains the same amount of relative compression deformation during power transmission. A locating edge 64 is provided on the periphery of each elastic component 14, 16 and 18 to keep th loaded ring-shaped surface 84 in effective contact and to maintain the deformation of the elastic component uniform. In the middle of each elastic component 14, 16 and 18, a hole 68 provides space for the compression deformation of the elastic components.

The above-described structure gives the elastic components the characteristics of linear elastic deformation. The Shore hardness of the forward elastic components 14 and 16 is preferably 79°–81°, while the Shore-hardness of the rearward elastic components 18 is 37°–39°.

Cooling of the elastic components 14, 16 and 18 is achieved by utilizing a self-pumping action of the components. To this end, semicircular grooves 66 are formed at the middle of the both side faces of each elastic component. When the components recover from deformation, hot air can be expelled automatically from the cavities of the components so that ventilating and cooling are realized and the durability of the components is increased.

Forward and rearward components 14, 16 and 18 are all made of rubber material without any steel base, connecting bolts or special adhesives. Their configurations and sizes are identical except that the compositions and characteristics of the rubber can differ. Thus, the number of different manufacturing molds can be reduced, and the selection, grouping and installation of the elastic components is facilitated when rigidity adjustments at the location of the rolling machine are required.

The elastic components of a coupling in accordance with the present invention can be prestressed and grouped during installation. In this way, the torsional play during power transmission is eliminated.

During installation, the tapered shank 72 of each wedge-shaped arm 20 is inserted into the respective steel sleeve 32 of intermediate disk 12. Shoulder 54 of the arm 20 is inserted in the wedge- or V-shaped groove 30 at the respective hole 28. Each arm 20 is fixed to intermediate disk 12 by means of a respective nut 70. The other end of each arm 20 is inserted into a corresponding wedge-shaped cavity 22 of coupling half 8.

Then all rearward rubber elastic components 18 are inserted into wedge-shaped cavities 22 on the upstream or force-receiving side of arms 20 (the rearward side in the rotating direction of the coupling), as shown in circle I of FIG. 1A. Square holes 34 on intermediate disk 12 are subsequently aligned with holes 26 on coupling half 8 and special tools are inserted into holes 26 through one side of square holes 34. Relative rotation takes place between coupling half 8 and intermediate disk 12 by rotating the special tools, whereby wedge-shaped arms 20 will compress rearward elastic components 18 to a controllable angle, as shown in circle II of FIG. 1A. Thereupon the forward elastic components 14 and 16 can be installed smoothly into wedge-shaped cavities 22 on the downstream or force-transmitting side of arms 20 (the forward side in the rotating direction of the coupling), as shown in circle III of FIG. 1A. At that point, special tools can be removed by rotating them in opposite direction and the installation of the elastic components is completed.

The rearward elastic components 18 apply their prestressed pressure to the forward components 14 and 16 through wedge-shaped cantilever arms 20. The different states of prestressed compression of the forward and rearward elastic components enable power transmission without play for the coupling during rotation and particularly upon reversals in the direction of rotation. Elastic components 14, 16 and 18 and arms 20 can be replaced separately as required. The replacing precedure is the same as for prestressed installation and the operation is simple and safe.

The loaded friction surfaces of square holes 34 on intermediate disk 12, used for prestressing of elastic components 14, 16 and 18, may be strengthened by spray welding a self-melting powdered alloy.

The special tool referred to hereinabove is a shaft which has a cam at one end and can be connected to a spanner at the other end. The tool is simple and easy to manufacture.

Preferably, elongated holes 36 on intermediate disk 12 are arranged in alternation with square holes 34 so that it is convenient to select a hole for installation, thus reducing installation time. Each hole 26 is aligned with a respective elongated hole 36 upon the completion of installation of elastic components 14, 16 and 18. Locating pins 78 can be inserted into elongated holes 36 from the sides of holes 26, and holes 26 are covered with cover plates, the installation of the locating pins is completed.

After holes 46 on coupling half 10 are aligned with holes 44 on intermediate disk 12, safety pin or pins 52 are inserted, which procedure completes the installation of the coupling of FIGS. 1A and 1B.

If the composition of the rubber material or the number of the elastic components is adjusted and the locating pins are replaced by other pins with corresponding specifications, the working characteristics (e.g., torsional rigidity and maximum elastic rotation angle OMAX) of the coupling can be changed to meet the requirements of different rolling machines.

Because wedge-shaped arms 20 leave clearance in wedge-shaped cavities 22 in axial and radial directions, and elastic components 14, 16 and 18 have multidirectional elasticity, when deviations occur in axial, radial or angular directions between the two coupling halves 8 and 10, the coupling can still operate normally to transmit torque.

Safety pins 52 of a coupling in accordance with the present invention are arranged along the outer periphery of the coupling. These pins are easy to change and their sizes and weights can be reduced as well, thereby minimizing their cost. Moreover, less axial space is needed for installing and removing the pins.

An alternative structural design is also provided for changing an elastic coupling pursuant to the present invention into a rigid coupling with cylindrical nylon pins. After all the elastic components are removed, holes 38 on intermediate disk 12 are aligned with a holes 26 on coupling half 8. Cylindrical nylon pins with steel cores are then inserted into holes 38 through holes 26 and each hole 26 is covered with a cover plate. Thus, the elastic coupling is changed into a rigid coupling and the tranformation is very simply achieved.

If the tapered shank of a wedge-shaped arm 20 is accidentally fractured, normal installation and removal of the elastic components 14, 16 and 18 associated with the arm will be difficult to carry out because the elastic components are in prestressed compression. Holes 40 on intermediate disk 12 are designed specifically for removing elastic components 14, 16 and 18 when the associated arm 20 is broken. One of the prestressed forward elastic components 14 or 16 in the wedge-shaped cavity 22 where the broken arm 20 exists can be pressed out from one side of coupling half 8 with the aid of a jack through a respective hole 40. After the compression prestressing is eliminated, the rest of the elastic components in the wedge-shaped cavity 22 and the broken arm 20 can be removed easily.

If the torque transmitted by the coupling exceeds the maximum value specified in the design, safety pins 52 will be sheared. Generally, a fractured pin 52 can only be pressed out when the respective hole 44 is fully aligned with a hole 46, but it is very difficult to obtain alignment and to remove a broken pin. For facilitating removal of fractured pins 52, elongated holes 48 and 50 are provided near holes 44 and holes 46, respectively. Intermediate disk 12 is rotated slightly until holes 44 and 46 are aligned respectively with elongated holes 50 and 48, whereupon it is easy to press out the two halves of the fractured pin.

Intermediate disk 12 is mounted on coupling half 10 via a thrust bearing 74. Between intermediate disk 12 and coupling half 10, a thrust washer 76 is disposed for preventing the intermediate disk from moving axially and creating an axial tension on safety pins 52. On thrust washer 76 there is a oil tunnel for the lubrication of a friction surface of the washer and the bearing 74.

Figure 7A:
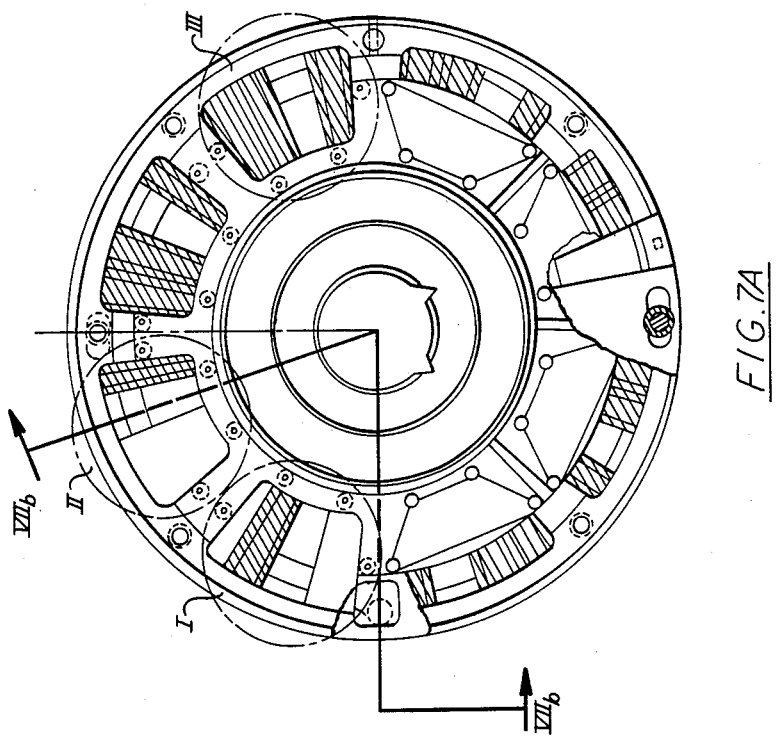
FIG. 7A is a front elevational view, partially in crosssectlon, of another coupling in accordance with the present invention.
Figure 7B:
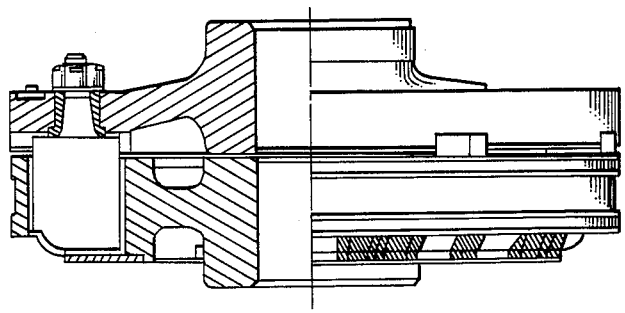
FIG. 7B is partially a side elevational view and partially a cross-sectional view taken along line $VII_b$—$VII_b$ in FIG. 7A.

FIG. 7 shows another embodiment of the present invention, wherein safety pins are not needed or the safety pins are installed on the other parts than the coupling so that the intermediate disk 12 and the drive coupling half 10 in the first embodiment of this invention are combined into one coupling half and the thrust bearing is omitted. The structure of this coupling half is basically same as that of the intermediate disk 12.

Two industrial units in accordance with the present invention have been put into operation in the drive systems of rolling machines in the city of Chengdu, China. Compared with adjustments in conventional couplings, changing the elastic components 14, 16 and 18 is faster, safer and easier. Moreover, the manufacturing cost of couplings pursuant to the present invention is much lower than that of prior art couplings.

Although the invention has been described in terms of specific embodiments and application, one of ordinary skill in the art, in light of this teaching, can generate additional embodiments and modifications without departing from the spirit of or exceeding the scope of the claimed invention. Accordingly, it is to be understood that the descriptions and illustrations herein are profferred to facilitate comprehension of the invention and should not be construed to limit the scope thereof.

What is claimed is:

1. A rotary safety coupling for the transmission of large torques, comprising:
   a first coupling half;
   a second coupling half;
   an intermediate disk disposed between said first coupling half and said second coupling half, said intermediate disk being connected to said second coupling half by means of safety pins;
   a plurality of cantilever arms fixed to said intermediate disk and having projecting portions extending therefrom towards said first coupling half, said cantilever arms taking the form of wedges with shoulders;
   a plurality of elastic components made of rubber, each of said elastic components having a first cross-section in the form of a wedge having inner and outer arcs in the form of circles concentric with a coupling axis, said first cross-section being parallel to the direction of power transmission, each of said elastic components having a second cross-section in the form of a ring provided with a centrally located hole, said second cross-section being perpendicular to the direction of force transmission; and
   means on said first coupling half for receiving said elastic components and the projecting portions of said cantilever arms, the projecting portion of each of said cantilever arms being disposed between at least two of said elastic components, said elastic components being disposed in a prestressed condition in said receiving means, whereby play is eliminated in reversals of force transmission between said first coupling half and said second coupling half, said receiving means includes a plurality of angularly equispaced wedge-shaped cavities in said first coupling half.

2. A coupling according to claim 1 wherein said cavities and said cantilever arms are each of an even number and wherein said cantilever arms are angularly equispaced on said intermediate disk.

3. A coupling according to claim 1 wherein said elastic components have locating edges.

4. A coupling according to claim 1 wherein said elastic components have side faces provided with means including grooves for ventilating and dissipating heat from said elastic components.

5. A coupling according to claim 1 wherein the shapes and sizes of said elastic components are uniform.

6. A coupling according to claim 1 wherein said elastic components include forward elastic components and rearward elastic components, said forward elastic components each being disposed on a downstream side of the respective one of said cantilever arms and said rearward elastic components each being disposed on an upstream side of the respective one of said cantilever arms, as defined by a normal direction of force transmission.

7. A coupling according to claim 1 wherein said first coupling half is provided with means including openings for dissipating heat and ventilating said elastic components.

8. A coupling according to claim 1 wherein said first coupling half is provided with means including a plurality of multifunction holes for facilitating the prestress of said elastic components, for enabling the insertion of angle locating pins and for enabling the insertion of nylon cylindrical pins.

9. A coupling according to claim 1 wherein said intermediate disk is provided with means including a plurality of angularly equispaced holes for receiving sleeves which fix and locate said cantilever arms, said intermediate disk being further provided with a plurality of radial grooves which are mated with the shoulders of said cantilever arms.

10. A coupling according to claim 1 wherein said intermediate disk is provided with means including a plurality of substantially square holes spaced from one another and corresponding to said multifunction holes, for enabling the installing and prestressing of said elastic components.

11. A coupling according to claim 10 wherein said intermediate disk is provided with means including a plurality of elongated holes spaced from one another and alternating with said square holes, corresponding to said multifunction holes, for installing angle locating pins.

12. A coupling according to claim 11 wherein said intermediate disk is provided with means including a plurality of holes spaced from one another along the outer periphery of said intermediate disk corresponding to said multifunction holes, for installing nylon cylindrical pins.

13. A coupling according to claim 1 wherein said intermediate disk is provided with means including a plurality of angularly spaced holes for enabling the pressing out of said elastic components upon a breaking of said cantilever arms, said intermediate disk being further provided with means including holes for facilitating ventilating of and the dissipating of heat from said elastic components.

14. A coupling according to claim 1 wherein said intermediate disk and said second coupling half are each provided with a plurality of holes arranged uniformly along the outer periphery therof for receiving safety pins, and are each further provided with a plurality of elongated holes arranged uniformly along the outer periphery thereof for removing broken pins, said holes and said elongated holes being located at substantially the same radial distance from said coupling axis.

15. A rotary safety coupling for the transmission of large torques, comprising:
   a first coupling half;
   a second coupling half;
   an intermediate disk disposed between said first coupling half and said second coupling half, said intermediate disk being connected to said second coupling half by means of safety pins;
   a plurality of cantilever arms fixed to said intermediate disk and having projecting protions extending therefrom towards said first coupling half, said cantilever arms taking the form of wedges with shoulders, said intermediate disk being further provided with a plurality of radial grooves which are mated with the shoulders of said cantilever arms;
   a plurality of elastic components made of rubber; and
   means on said first coupling half for receiving said elastic components and the projecting portions of said cantilever arms, the projecting portion of each of said cantilever arms being disposed between at least two of said elastic components, said elastic components being disposed in a prestressed condition in said receiving means, whereby play is eliminating in reversals of force transmission between said first coupling half and said second coupling half.

16. A coupling according to claim 15 wherein said receiving means includes a plurality of angularly equispaced wedge-shaped cavities in said first coupling half.

17. A coupling according to claim 15 wherein said cavities and said cantilever arms are each of an even number and wherein said cantilever arms are angularly equispaced on said intermediate disk.

18. A coupling according to claim 15 wherein each of said elastic components has a first cross-section in the form of a wedge having inner and outer arcs in the form of circles concentric with a coupling axis, said first cross-section being parallel to the direction of power transmission, each of said elastic components having a second cross-section in the form of a ring provided with a centrally located hole, said second cross-section being perpendicular to the direction of force transmission.

19. A coupling according to claim 15 wherein said elastic components have located edges.

20. A coupling according to claim 15 wherein said elastic components have side faces provided with means including grooves for ventilating and dissipating heat from said elastic components.

21. A coupling according to claim 15 wherein the shapes and sizes of said elastic components are uniform.

22. A coupling according to claim 15 wherein said elastic components include forward elastic components and rearward elastic components, said forward elastic components each being disposed on a downstream side of the respective one of said cantilever arms and said rearward elastic components each being disposed on an upstream side of the respective one of said cantilever arms, as defined by a normal direction of force transmission.

23. A coupling according to claim 15 wherein said first coupling half is provided with means including openings for dissipating heat and ventilating said elastic components.

24. A coupling according to claim 15 wherein said first coupling half is provided with means including a plurality of multifunction holes for facilitating the prestress of said elastic components, for enabling the insertion of angle locating pins and for enabling the insertion of nylon cylindrical pins.

25. A coupling according to claim 15 wherein said intermediate disk is provided with means including a plurality of angularly equispaced holes for receiving sleeves which fix and locate said cantilever arms.

26. A coupling according to claim 15 wherein said intermediate disk is provided with means including a plurality of substantially square holes spaced from one another and corresponding to said multifunction holes, for enabling the installing and prestressing of said elastic components.

27. A coupling according to claim 26 wherein said intermediate disk is provided with means including a plurality of elongated holes spaced from one another and alternating with said square holes, corresponding to said multifunction holes, for installing angle locating pins.

28. A coupling according to claim 29 wherein said intermediate disk is provided with means including a plurality of holes spaced from one another along the outer periphery of said intermediate disk corresponding to said multifunction holes, for installing nylon cylindrical pins.

29. A coupling according to claim 15 wherein said intermediate disk is provided with means including a plurality of angularly spaced holes for enabling the pressing out of said elastic components upon a breaking of said cantilever arms, said intermediate disk being further provided with means including holes for facilitating ventilating of and the dissipating of heat from said elastic components.

30. A coupling according to claim 15 wherein said intermediate disk and said second coupling half are each provided with a plurality of holes arranged uniformly along the outer periphery thereof for receiving safety pins, and are each further provided with a plurality of elongated holes arranged uniformly along the outer periphery thereof for removing broken pins, said holes and said elongated holes being located at substantially the same radial distance from said coupling axis.

* * * * *

UNITED STATES PATENT AND TRADEMARK OFFICE
CERTIFICATE OF CORRECTION

PATENT NO. : 4,743,216

DATED : May 10, 1988

INVENTOR(S) : CHEN et al.

It is certified that error appears in the above-identified patent and that said Letters Patent is hereby corrected as shown below:

```
     Front page, under [73] Assignee, replace "Tupe"
by --Tube--.

Column 1, line 5, replace "BACKGKROUND"
by --BACKGROUND--.

Column 1, line 5, replace "if" by --of--.

Column 3, lines 17 and 18, replace "cros-ssection"
by --cross-section--.

Column 4, line 17, replace "sectlon"
by --section--.

Column 5, line 14, replace "in on FIGS."
by --in FIGS.--.

Column 5, line 14, replace "2B on" by --2B, on--.

Column 5, line 36, replace "alternatively"
by --alternately--.
```

UNITED STATES PATENT AND TRADEMARK OFFICE
CERTIFICATE OF CORRECTION

PATENT NO. : 4,743,216

DATED : May 10, 1988

INVENTOR(S) : CHEN et al.

It is certified that error appears in the above-identified patent and that said Letters Patent is hereby corrected as shown below:

```
     Column 5, line 64, replace "5C wedge"
by --5C, wedge--.

Column 7, line 29, replace "prece-"
by --proce---.

Column 8, line 11, replace "with a holes"
by --with holes--.

Column 10, line 61, replace "protions"
by --portions--.

Column 11, line 26, replace "located"
by --locating--.

Column 12, line 23, replace "29" by --27--.
```

Signed and Sealed this

Fifteenth Day of November, 1988

*Attest:*

DONALD J. QUIGG

*Attesting Officer*       *Commissioner of Patents and Trademarks*